J. H. HAMMOND, Jr.
POSITION REVEALING SYSTEM FOR TORPEDOES.
APPLICATION FILED AUG. 18, 1917. RENEWED SEPT. 28, 1920.
1,376,762.
Patented May 3, 1921.
2 SHEETS—SHEET 1.
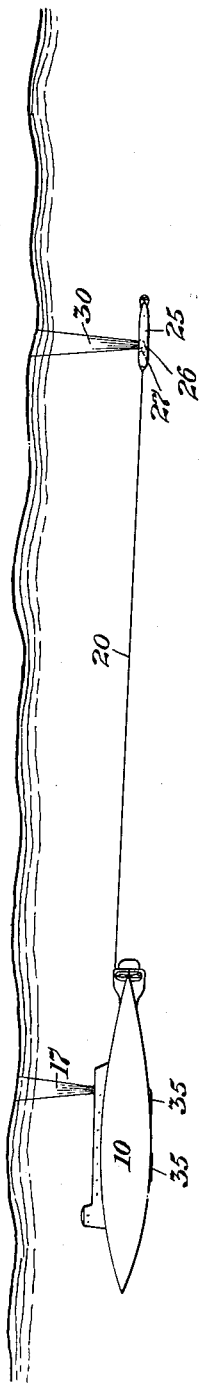
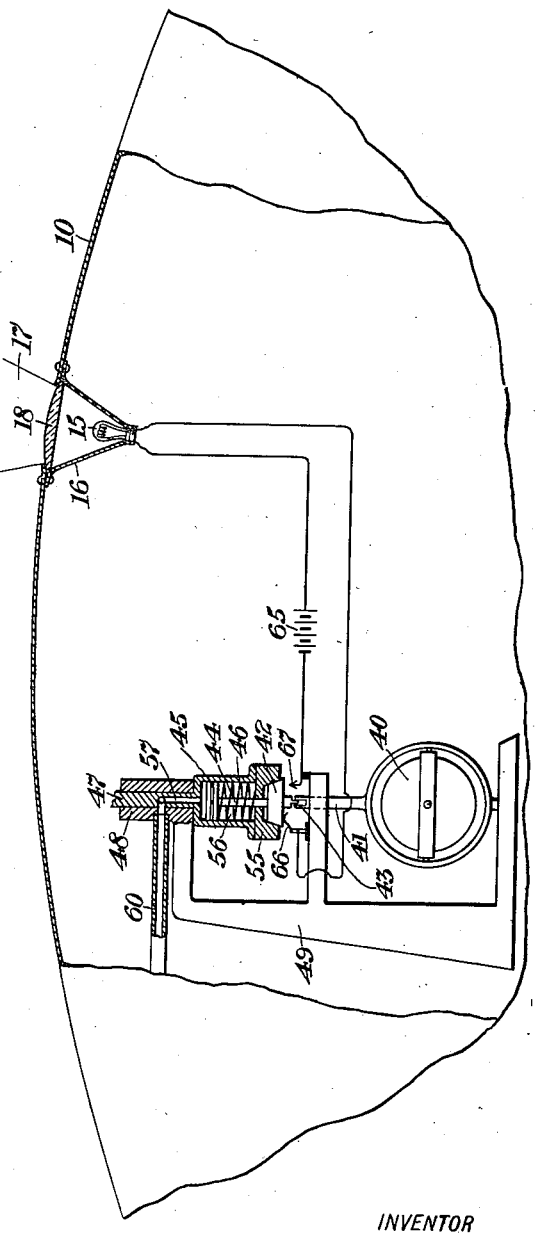
INVENTOR
John Hays Hammond Jr
BY
A. J. Gardner
HIS ATTORNEY

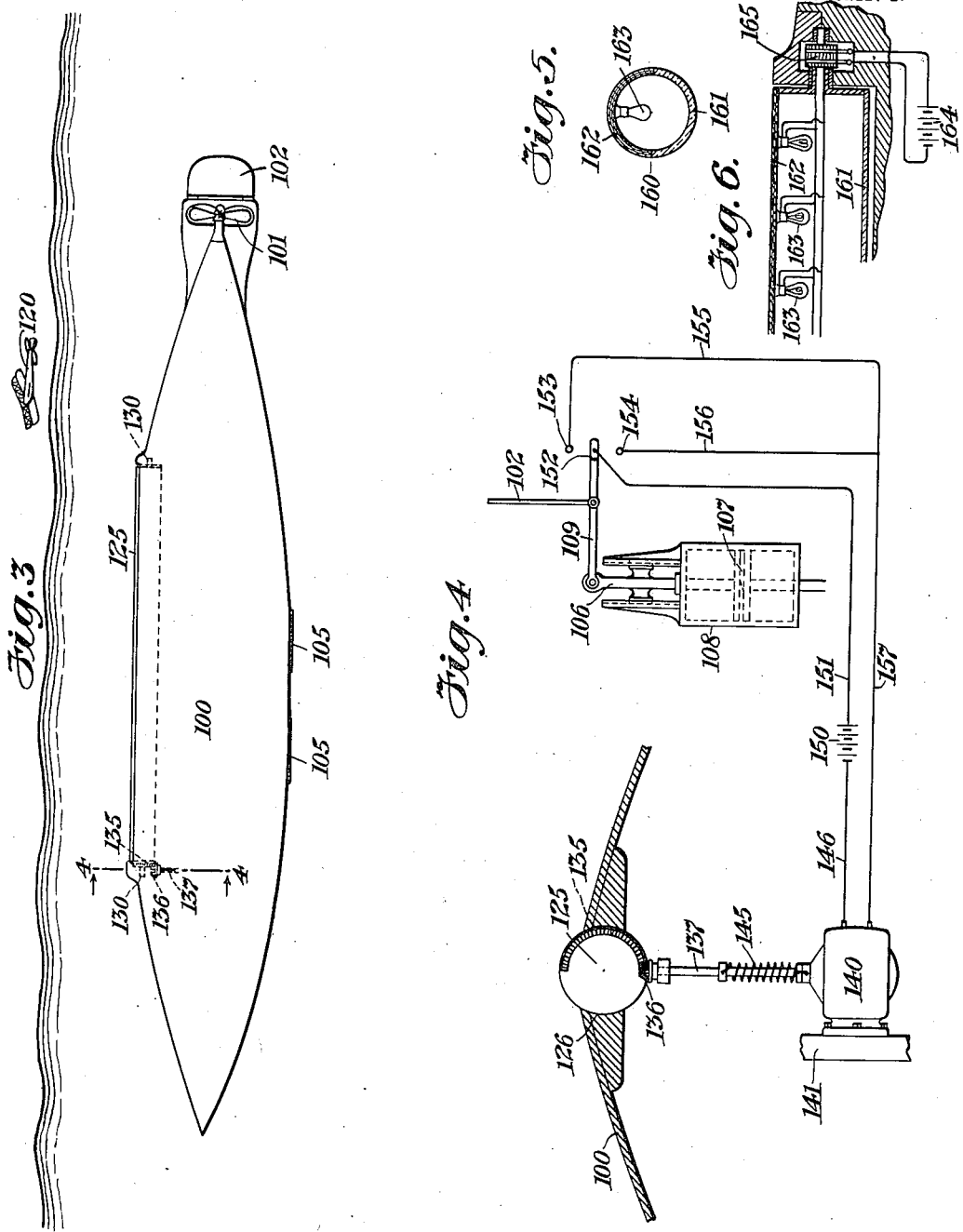

UNITED STATES PATENT OFFICE.

JOHN HAYS HAMMOND, JR., OF GLOUCESTER, MASSACHUSETTS.

POSITION-REVEALING SYSTEM FOR TORPEDOES.

1,376,762. Specification of Letters Patent. Patented May 3, 1921.

Application filed August 18, 1917, Serial No. 186,982. Renewed September 28, 1920. Serial No. 413,439.

*To all whom it may concern:*

Be it known that I, JOHN HAYS HAMMOND, Jr., a citizen of the United States, and a resident of Gloucester, in the county of Essex and State of Massachusetts, U. S. A., have invented certain new and useful Improvements in Position-Revealing Systems for Torpedoes, of which the following is a specification.

Some of the objects of this invention are to provide an improved position revealing system particularly adapted to be used upon a submarine torpedo or other submarine vessel while it is being steered from a distant control station, and for the purpose of revealing the position of the torpedo or other vessel from time to time to a friendly observer at the control station, and while keeping the actual position of the torpedo concealed either for the major part of the time or continuously from unfriendly observations; and to provide other improvements as will appear hereinafter.

In the accompanying drawings, Figure 1 is a side elevation of one embodiment of this invention as applied in combination with a submarine torpedo; Fig. 2 is an enlarged fragmentary longitudinal section of the torpedo shown in Fig. 1; Fig. 3 is a side elevation of a modified form of this invention as applied to a submarine torpedo; Fig. 4 is a diagrammatic transverse section on the line 4—4 of Fig. 3; Fig. 5 represents a modified form of signal for night operation; and Fig. 6 represents a fragmentary longitudinal section of the same.

Referring to the drawings, and particularly to Figs. 1 and 2, one embodiment of this invention, as applied to a submarine torpedo 10, includes an electric lamp or other suitable source of light 15 which is arranged within or upon the torpedo 10 within a suitable reflector 16 fixed with respect to the torpedo and arranged to throw a beam of light 17 upwardly from the lamp 15 through a lens 18 fixed over the lamp 15 and forming a closure for an opening provided therefor in the upper wall of the torpedo. The lamp 15 is arranged, as will appear hereinafter, to be energized or rendered active from time to time to reveal the position of the torpedo 10 only when the direction of movement of the torpedo is changed, and secured to the torpedo 10 by means of a tow line 20 is a submarine trailer 25 which is provided with an electric lamp 26 or other source of light which is arranged within the trailer and within a suitable reflector 27 carried by the trailer to project a continuous beam of light 30 upwardly through the water in which the trailer is submerged.

The torpedo 10 is arranged to be controlled from a distance in any suitable manner, as for instance in response to submarine sound waves, and for this purpose is provided with one or more sound-responsive diaphragms 35 which are arranged to control any well known or suitable steering mechanism carried by the torpedo 10 and including a gyroscope 40 or other direction maintaining means which is arranged in a well known manner to hold against rotation in space a normally vertical shaft 41 the longitudinal axis of which is fixed with respect to the torpedo 10. The shaft 41 carries at its upper end a clutch member 42 which is held against rotation with respect to the shaft 41 and which has a limited movement longitudinally of the shaft 41 but which is held against rotation with respect to the shaft 41 by means of a tongue or diametrical lug 43 which engages snugly but slidably in a diametrical slot provided therefor in the upper end of the shaft 41. The clutch member 42 is rotatably secured to the lower end of a piston rod 44 which is arranged in alinement with the shaft 41 and which is secured at its upper end to a piston 45 which is arranged to reciprocate in a cylinder 46 which is rigid with the lower end of a vertical spindle 47 which is in alinement with the shaft 41 and piston rod 44, and which is held snugly but rotatably in a bearing 48 rigid with a standard 49 which is fixed with respect to the torpedo 10. The spindle 47 is operatively connected to the rudder of the torpedo 10 in any well known or suitable manner to normally control the rudder in such a manner as to cause the torpedo 10 to proceed upon a straight course while under the control of the gyroscope 40. Rigidly secured to the lower end of the cylinder 46 and loosely surrounding the piston rod 44 is a clutch member 55 which is arranged to be engaged by the clutch member 42 which is always rotatably controlled by the gyroscope 40. The lower clutch member 42 is normally pressed upwardly into engagement with the upper clutch member 55 by means of a spiral spring 56 which is arranged within the cylinder 46 and surrounds the piston rod 44 between the piston 45 and the clutch member 55, and the piston 45 is arranged to be forced downwardly from time to time in response to compressed air which is permitted to flow into the upper end of the cylinder 46 through an axial conduit 57 which extends axially upwardly in the lower end of the spindle 47 and which communicates at all times with a pipe 60 which is fixed with respect to the torpedo 10 and which is controlled in any well known or suitable manner to permit compressed air to flow into the upper end of the cylinder 46 to disconnect the lower clutch member 42 from the upper clutch member 55 and thus render the gyroscope 40 inoperative to control the direction of movement of the torpedo 10 whenever the direction of movement of the torpedo 10 is being changed or varied by the operator from the distant control station. Normally the lower clutch member 42 is in engagement with the upper clutch member 55 and the gyroscope 40 is thus rendered operative to cause the torpedo 10 to proceed on a straight course. For energizing or illuminating the lamp 15 carried by the torpedo 10 whenever the direction of movement of the torpedo 10 is being changed under the control of the operator at the distant control station, the lamp 10 is arranged in a normally open circuit which is arranged to be energized by a battery 65 or other source of electric energy and which includes an electric resilient contact 66 which is always in engagement with the lower clutch member 42, and a fixed contact 67 which is normally spaced below the lower clutch member 42 but which is arranged to be engaged by the lower clutch member 42 to close the circuit through the battery 65 and lamp 15 whenever the lower clutch member 42 is in its lowermost position.

From the foregoing it is thought to be evident that whenever the torpedo 10 is proceeding upon a straight course the circuit through the lamp 15 will be opened and the lamp 15 will not be illuminated but whenever the direction of movement of the torpedo 10 is being changed, the circuit through the lamp 15 will be closed and the lamp will be illuminated through the entire period during which such change is being effected. Whenever only the beam of light 30 from the submarine trailer 25 is observed by the operator, the operator may determine the position of the torpedo 10 by noting the direction of movement of the beam 30, the length of the tow line 20 being known; and whenever the direction of movement of the torpedo 10 is being changed by the operator, the position of the torpedo 10 will be revealed by the beam 17 which is temporarily emitted by the light 15 carried by the torpedo.

This invention is shown in its modified form in Figs. 3 and 4 as applied to a submarine torpedo 100 which is arranged to be actuated by a propeller 101 and steered by a rudder 102 carried by the torpedo and arranged to swing with respect thereto about a normally vertical axis. The rudder 102 is arranged to be controlled from a distance by any suitable means arranged within the torpedo, as for instance by means responsive to submarine sound waves and including one or more diaphragms 105 and a piston rod 106 which is rigidly secured at its inner end to a piston 107 arranged to reciprocate in a fixed cylinder 108 and which is operatively connected at its outer end to a lever 109 which is rigid with and arranged to oscillate the rudder 102, the piston 107 being controlled pneumatically in any well known or suitable manner in response to submarine sound waves received by the diaphragms 105.

For revealing the position of the torpedo 100 to an observer located upon an aircraft 120 or in any other suitable position, an elongated cylinder 125 is arranged upon the upper side or back of the body of the torpedo 100 in a recess 126 provided therefor in the upper surface of the body of the torpedo and extending longitudinally thereof, the cylinder 125 being arranged so that only the major portion of its upper surface throughout the length of the cylinder will be exposd to view at any particular moment. The cylinder 125 is arranged to rotate about an axis coincident with its longitudinal axis on two trunnions or pivots 130 which are rigid with the opposite ends of the cylinder and which engage snugly but rotatably in recesses or bearings provided therefor which are rigid with the body of the torpedo 100. The outer surface of the body of the torpedo 100 is preferably painted a dull gray-green or other suitable color approximately matching the color of the bottom of the harbor in which the torpedo is designed to operate so as to render the torpedo when submerged normally invisible from an aeroplane 120, and half of the cylinder 125, the upper half as shown in Figs. 3 and 4, is also painted the same color, and this half of the cylinder 125 is normally arranged to face upwardly so as to render the cylinder normally invisible from the aeroplane 120. The other or normally lower half of the cylinder 125 is formed of metal which is highly polished so as to have a bright silvery color which, when the cylinder 125 is rotated through half a revolution so as to cause the highly polished metal surface to face upwardly, will render the cylinder 125 readily visible from the aeroplane 120.

For rotating the cylinder 125 automatically through half a revolution from its normal invisible position into its visible position, one end of the cylinder 125 is provided with a beveled gear 135 rigid and coaxial therewith which is engaged by a beveled pinion 136 fixedly secured upon the upper end of a normally vertical shaft 137 which is arranged to be rotated by an electric motor 140 which is secured to the lower end of the spindle 137 and which is fixedly secured to a support 141 arranged within and rigid with the body of the torpedo 100. Surrounding the shaft 137 is a spiral spring 145 one end of which is rigidly secured to the shaft 137 and the other end of which is secured in a fixed position upon the motor 140. This spring 145 acts to hold the shaft 137 normally in such an initial position as to cause the cylinder 125 to be held with its invisible side facing upwardly, and the spring 145 also acts to return the shaft 137 to its initial position of rotation after it has been rotated by the motor 140 through a sufficient number of revolutions to cause the cylinder 125 to be rotated through half a revolution for the purpose of causing the polished side of the cylinder 125 to face upwardly.

For energizing the motor 140 to rotate the cylinder 125 through half a revolution from time to time whenever the torpedo 100 is being diverted from a straight course, one terminal of the motor 140 is connected by a conductor 146 to one pole of a battery 150, the other pole of which is connected by a conductor 151 to a contact 152 carried by but insulated from the free end of the hereinbefore described lever 109 which controls the rudder 102. Spaced upon the opposite sides of and in the path of and normally at equal distances from the movable contact 152 are two fixed contacts 153 and 154 which are connected by branch conductors 155 and 156 respectively to a return conductor 157 which leads to the other terminal of the motor 140. Whenever the piston 107 is moved into its uppermost position to swing the rudder 102 in a clockwise direction as viewed in Fig. 4 and to turn the torpedo 100 toward the left, the contact 152 carried by the free end of the arm 109 will be moved into engagement with the stationary contact 154 to close the circuit through the battery 150 and the motor 140 and thus rotate the shaft 137 through a sufficient number of revolutions to cause the cylinder 125 to be rotated through half a revolution to render the cylinder 125 visible from the aeroplane 120, as hereinbefore described. If the piston 107 should now be permitted to return to its central position to rotate the rudder 102 to its central position, (as shown in Fig. 4,) the circuit would be broken through the battery 150 and the motor 140 and the spiral spring 145 would then act to return the shaft 137 into its initial position of rotation, thus returning the cylinder 125 into its normal invisible position.

Whenever the piston 107 is moved downwardly into its lowermost position to swing the rudder 102 in a counterclockwise direction, as viewed in Fig. 4, the contact 152 will be moved into engagement with the fixed contact 153 and will close the circuit through the battery 150 and motor 140 and thus again rotate the cylinder 125 into a visible position, and when the piston 107 is permitted to be rotated into a central position to return the rudder 102 into a central position, the circuit will be broken through the motor 104 and the cylinder 125 will be rotated into its normal invisible position by the spiral spring 145.

For controlling the torpedo at night, instead of the hereinbefore described cylinder 125, a cylinder 160 may be provided, one-half 161 of which is made of glass as shown in Fig. 5, the other half 162 being made of some opaque material. Within this cylinder a number of electric lamps 163 are arranged which are preferably secured to the inner surface of the opaque wall 162 of the cylinder and which are arranged to be supplied with electric current from a battery 164 or other source located outside of the cylinder but within the torpedo 100 and operatively connected to the lamps through a suitable commutator 165 carried by the cylinder 160. This modified cylinder is arranged to be operated as hereinbefore described to present normally its opaque side upwardly but to turn the transparent side upwardly to bring the light from the lamps 163 into view whenever the torpedo is being diverted from a straight course.

Although only two forms in which this invention may be embodied have been shown herein, it is to be understood that the invention is not limited in its application to any specific construction but might be applied in various systems without departing from the spirit of the invention or the scope of the appended claims.

Having thus fully described this invention, I claim:

1. The combination with a movable body, of normally invisible position revealing means carried by said body, means acting upon said position revealing means to render said position revealing means visible whenever said body is caused to be diverted from a straight course and an auxiliary submerged position revealing means towed by said body.

2. The combination with a movable body, of controlling means carried thereby for modifying the movement of said body, normally invisible means carried by said body for revealing the position thereof periodically, means controlled by said controlling means for rendering said position revealing means visible periodically and an auxiliary submerged position revealing means towed by said body 3. The combination with a movable body, of means including direction maintaining means for controlling the movement of said body, normally invisible position revealing means carried by said body and arranged to be controlled by said direction maintaining means to render said position revealing means visible periodically and an auxiliary submerged position revealing means towed by said body.

4. The combination with a movable body, of means including direction maintaining means for controlling the movement of said body, normally invisible position revealing means carried by said body and arranged to be controlled by said direction maintaining means to render said position revealing means visible whenever said body is diverted from a straight course and an auxiliary submerged position revealing means towed by said body.

5. The combination with a movable body, of means including a gyroscope for automatically causing said body to proceed upon a predetermined straight course, controlling means for rendering said gyroscope either operative or inoperative, and means controlled by said controlling means for revealing the position of said movable body.

6. The combination with a movable body, of direction maintaining means automatically operative to cause said body to proceed upon a predetermined straight course, means for rendering said direction maintaining means either operative or inoperative to control the direction of movement of said body, and means controlled by said controlling means for revealing the position of said body periodically whenever said direction maintaining means is rendered inoperative.

7. The combination with a movable body, of direction maintaining means carried thereby for automatically controlling the movement of said body, controlling means controlled from a distance for modifying the action of said direction maintaining means, and means controlled by said controlling means for revealing the position of said body periodically.

8. The combination with a movable body, of means including a gyroscope for automatically causing said body to proceed upon a predetermined straight course, controlling means for modifying the action of said gyroscope, and means controlled by said controlling means for revealing the position of said body.

9. The combination with a submarine torpedo, of steering means carried thereby for controlling the direction of movement of said torpedo, and means controlled by said steering means for revealing the position of said torpedo periodically.

10. The combination with a submarine torpedo, of steering means carried thereby for controlling the direction of movement thereof, normally invisible position revealing means carried by said torpedo and arranged to be rendered visible as the result of a divergence of said torpedo from a straight course and an auxiliary submerged position revealing means towed by said body.

11. The combination with a movable body, of means for controlling the direction of movement of said body, position revealing means carried by said body and arranged to be moved from a normally invisible position into a visible position as the result of a diversion of said body from a given course to reveal the position of said body and an auxiliary submerged position revealing means towed by said body.

12. The combination with a movable body, of means for controlling the direction of movement of said body, position revealing means carried by said body and arranged to be rotated from a normally invisible position into a visible position as the result of a diversion of said body from a given course to reveal the position of said body and an auxiliary submerged position revealing means towed by said body.

13. The combination with a movable body, of means for controlling the direction of movement of said body, a normally invisible source of light carried by said body and arranged to be rendered visible as the result of a diversion of said body from a given course and an auxiliary submerged position revealing means towed by said body.

14. The combination with a movable body, of means for controlling the direction of movement of said body, an electric light carried by said body, means for causing said electric light to be illuminated periodically as the result of a change in the direction of movement of said body and an auxiliary submerged position revealing means towed by said body.

15. The combination with a movable body, of means for controlling the direction of movement of said body, a submerged element carried by said body and having a portion provided with a normally exposed surface which is normally substantially invisible when viewed from a distance and having a portion provided with a normally concealed surface which is readily visible when viewed from a distance, and means arranged to be controlled as the result of a variation in the direction of movement of said body for moving said element in such a manner as to expose said normally concealed surface.

16. The combination with a submarine torpedo, of a submarine trailer connected thereto and towed thereby, means carried by said trailer and continuously revealing the position thereof, and normally concealed means carried by said torpedo and arranged to be rendered visible periodically as the result of a change in the direction of movement of said torpedo.

17. The combination with a submarine torpedo, of a submarine trailer connected to and towed by said torpedo, means carried by said trailer and continuously operative to constantly reveal the position of said trailer, and normally inoperative means carried by said torpedo and arranged to be rendered operative periodically as the result of a change in the direction of movement of said torpedo.

18. The combination with a submarine torpedo, of a submarine trailer connected thereto and towed thereby, a light carried by said trailer and continuously operative to reveal the position of said trailer, and a normally inoperative light carried by said torpedo and arranged to be rendered operative as the result of a change in the direction of movement of said torpedo.

19. The combination with a movable body, of means including a gyroscope for automatically causing said body to proceed upon a predetermined straight course, controlling means for modifying the action of said gyroscope, means controlled by said controlling means for revealing the position of said body, and an auxiliary submerged position revealing means towed by said body.

20. The combination with a submarine torpedo, of steering means carried thereby for controlling the direction of movement of said torpedo, means controlled by said steering means for revealing the position of said torpedo, and an auxiliary submerged position revealing means towed by said body.

21. The combination with a movable submarine body, of a submerged trailer towed by said body, and means on said trailer for revealing the position of said trailer.

22. The combination with a movable submarine body, of a submerged trailer towed by said body, and luminous means on said trailer for revealing the position of said trailer.

23. The combination with a movable submarine body, of means periodically operative to reveal the course of said body, a submerged trailer towed by said body, and means on said trailer for revealing the position of said trailer.

24. The combination with a submarine movable body, of a submarine trailer arranged to be towed by said body, and means on said trailer and controlled from said body for revealing the position of said trailer.

25. The combination with a submarine body, of a submarine trailer arranged to be towed by said body and submerged position revealing means carried by said trailer.

26. The combination with a submarine movable body, of a submarine trailer arranged to be towed by said body, a submerged position revealing means carried by said trailer, and periodically operative submerged position revealing means on said body.

Signed at New York, in the county of New York and State of New York, this 8th day of August, A. D. 1917.

JOHN HAYS HAMMOND, Jr.